United States Patent
Chen et al.

(10) Patent No.: US 12,471,999 B2
(45) Date of Patent: Nov. 18, 2025

(54) METHOD OF ORTHOPEDIC TREATMENT

(71) Applicants: Chang Gung Memorial Hospital, Linkou, Taoyuan (TW); National Taiwan University of Science and Technology, Taipei (TW)

(72) Inventors: Alvin Chao-Yu Chen, Taoyuan (TW); Yi-Sheng Chan, Taoyuan (TW); Chi-Pin Hsu, Taipei (TW); Shang-Chih Lin, Taipei (TW); Chin-Ju Wu, New Taipei (TW); Jeng-Ywan Jeng, Taipei (TW)

(73) Assignees: CHANG GUNG MEMORIAL HOSPITAL, LINKOU, Taoyuan (TW); NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 190 days.

(21) Appl. No.: 18/236,486

(22) Filed: Aug. 22, 2023

(65) Prior Publication Data
US 2024/0065765 A1 Feb. 29, 2024

(30) Foreign Application Priority Data
Aug. 23, 2022 (TW) .................................. 111131736

(51) Int. Cl.
| A61B 17/17 | (2006.01) |
| A61B 34/10 | (2016.01) |
| A61F 2/08 | (2006.01) |
| A61B 17/00 | (2006.01) |
| A61B 17/56 | (2006.01) |
| A61B 90/00 | (2016.01) |

(52) U.S. Cl.
CPC .......... *A61B 34/10* (2016.02); *A61B 17/1764* (2013.01); *A61F 2/0805* (2013.01); *A61B 2017/00526* (2013.01); *A61B 2017/564* (2013.01); *A61B 2017/568* (2013.01); *A61B 2034/102* (2016.02); *A61B 2034/108* (2016.02); *A61B 2090/064* (2016.02)

(58) Field of Classification Search
CPC ..... A61B 17/15; A61B 17/151; A61B 17/155; A61B 17/17; A61B 17/1764; A61B 2017/564; A61B 2017/568; A61B 2034/102; A61B 2034/108; A61B 34/10
See application file for complete search history.

(56) References Cited

U.S. PATENT DOCUMENTS

2022/0273450 A1* 9/2022 Steines ............... A61F 2/30942

* cited by examiner

*Primary Examiner* — Samuel S Hanna
(74) *Attorney, Agent, or Firm* — Panitch Schwarze Beliasrio & Nadel LLP

(57) ABSTRACT

A method of orthopedic treatment includes steps of: by using a computer aided design (CAD) tool based on profile data that is related to a to-be-treated part of a bone of a patient, obtaining a model of a preliminary instrument that substantially fits the to-be-treated part; by using the CAD tool, obtaining a model of a patient specific instrument (PSI) based on the model of the preliminary instrument; producing the PSI based on the model of the PSI, the PSI being adjustable; performing medical operation on the to-be-treated part, and then attaching the PSI to the to-be-treated part; after attaching the PSI to the to-be-treated part, adjusting the PSI such that the PSI is adapted to real conditions of the to-be-treated part.

2 Claims, 9 Drawing Sheets

METHOD OF ORTHOPEDIC TREATMENT

CROSS-REFERENCE TO RELATED APPLICATION

This application claims priority to Taiwanese Invention Patent Application No. 111131736, filed on Aug. 23, 2022.

FIELD

The disclosure relates to a method of an orthopedic treatment, and more particularly to a method of an orthopedic treatment with a patient specific instrument (PSI).

BACKGROUND

A patient specific instrument (PSI) has been widely used in orthopedic treatment, and aims at fitting a to-be-treated part of a bone of a patient. Conventionally, the PSI is not adjustable after being produced, so the PSI may not serve its intended function as well as expected.

SUMMARY

Therefore, an object of the disclosure is to provide a method of orthopedic treatment on a to-be-treated part of a bone of a patient that can alleviate at least one of the drawbacks of the prior art.

According to the disclosure, the method includes steps of: obtaining, by using a computer aided design (CAD) tool based on profile data that is related to the to-be-treated part, a model of a preliminary instrument that substantially fits the to-be-treated part; obtaining, by using the CAD tool, a model of a patient specific instrument (PSI) based on the model of the preliminary instrument, the PSI being adjustable to adapt to real conditions of the to-be-treated part; producing the PSI based on the model of the PSI; performing medical operation on the to-be-treated part, and then attaching the PSI to the to-be-treated part; and after attaching the PSI to the to-be-treated part, adjusting the PSI such that the PSI is adapted to the real conditions of the to-be-treated part.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
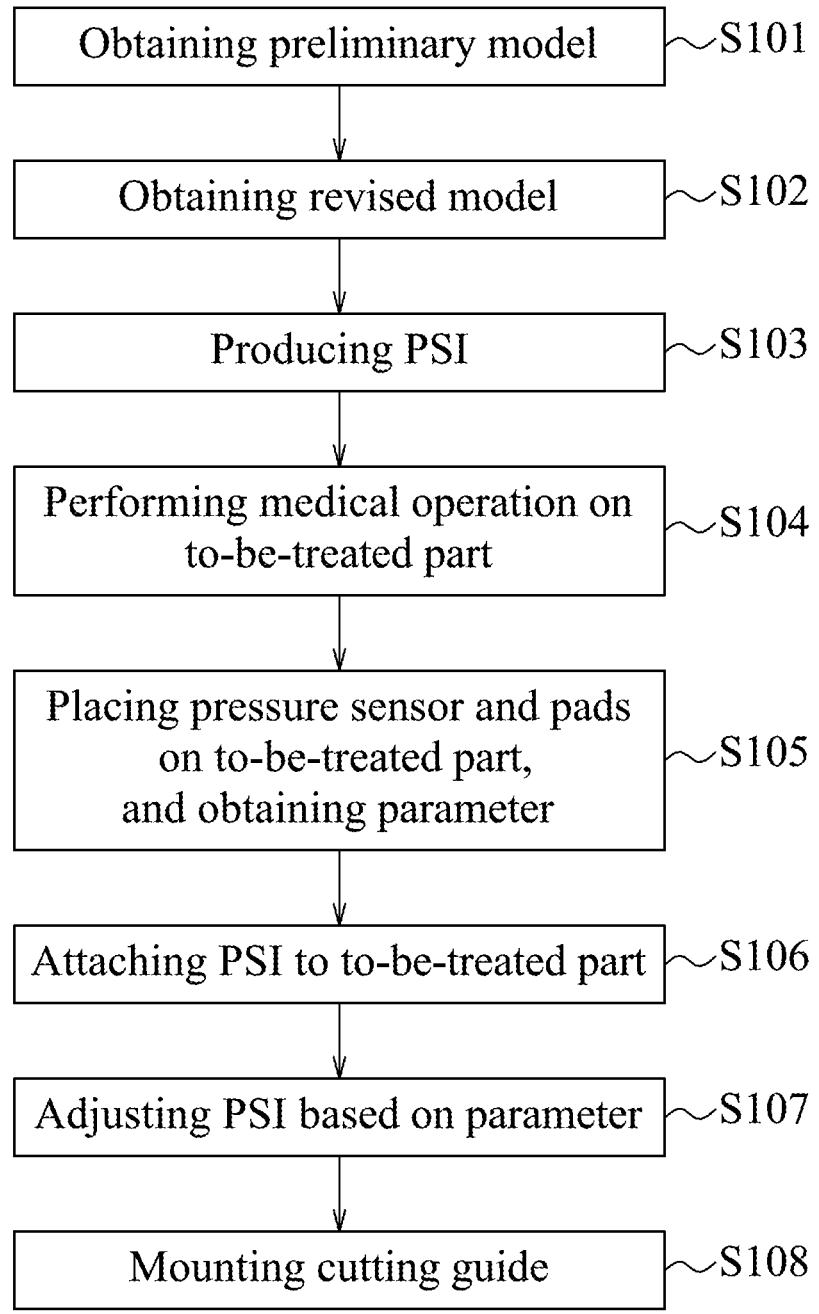
FIG. 1 is a flow chart illustrating a method of orthopedic treatment according to a first embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 6, a first embodiment of a method of orthopedic treatment on a to-be-treated part of a bone of a patient according to the disclosure is illustrated. In this embodiment, the orthopedic treatment is total knee arthroplasty (TKA), and the to-be-treated part is a femoral condyle and a proximal tibia of a lower limb (i.e., a left leg or a right leg) of the patient. The method includes steps S101 to S108 delineated below.

In step S101, by using a computer aided design (CAD) tool based on profile data that is related to the to-be-treated part, a model of a preliminary instrument (hereinafter referred to as the "preliminary model") that substantially fits the to-be-treated part is obtained. The CAD tool exemplarily includes Materialize Mimics Medical, Geomagic Wrap, and OOOPDS that is developed by Taiwan Main Orthopedic Biotechnology Co., but is not limited thereto. The profile data is obtained by using computed tomography (CT), but is not limited thereto. Since use of the CAD tool and CT has been well known to one skilled in the relevant art, detailed explanation of the same is omitted herein for the sake of brevity.

In step S102, by using the CAD tool, a model of a patient specific instrument (PSI) (hereinafter referred to as the "revised model") is obtained based on the preliminary model. The PSI is adjustable to adapt to real conditions of the to-be-treated part of the bone of the patient.

In step S103, the PSI is produced based on the revised model by using 3D printing techniques (also known as additive manufacturing). In particular, referring to FIG. 4, the PSI thus produced includes a frame 10 having a plurality of through holes 15, and at least one pin (not shown) that is removably inserted into at least one of the through holes 15, respectively. In this embodiment, the frame 10 includes four legs 101, and each of the legs 101 has three of the through holes 15. However, implementation of the frame 10 is not limited to the disclosure herein and may vary in other embodiments. Compared with the PSI, the preliminary instrument has a structure similar to that of the PSI, while each leg has only one through hole. It is worth to note that the PSI is produced by using a Tiertime UP Box+ 3D printer, which implements fused deposition modeling (FDM). However, implementation of 3D printing techniques is not limited to the disclosure herein and may vary in other embodiments. Since implementation of 3D printing techniques has been well known to one skilled in the relevant art, detailed explanation of the same is omitted herein for the sake of brevity.

In step S104, medical operation is performed on the to-be-treated part of the bone of the patient to expose the to-be-treated part, and the proximal tibia is resected. Since implementation of medical operation has been well known to one skilled in the relevant art, detailed explanation of the same is omitted herein for the sake of brevity.

Figure 2:
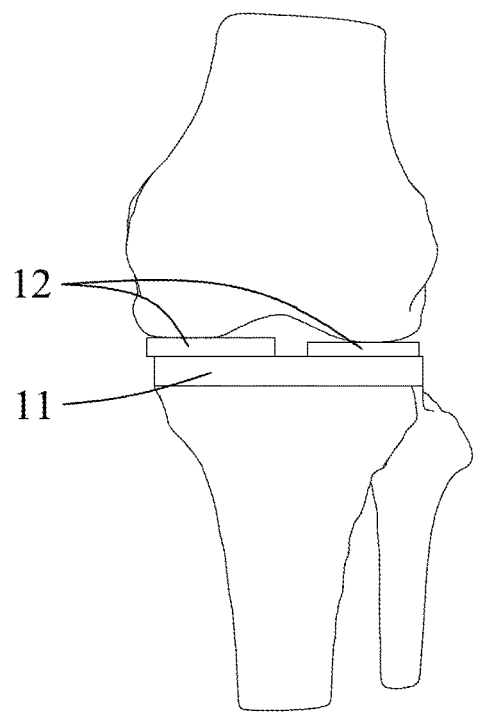
FIGS. 2 to 7 are schematic diagrams for illustrating operations performed in the method of orthopedic treatment according to the first embodiment of the disclosure.
Figure 3:
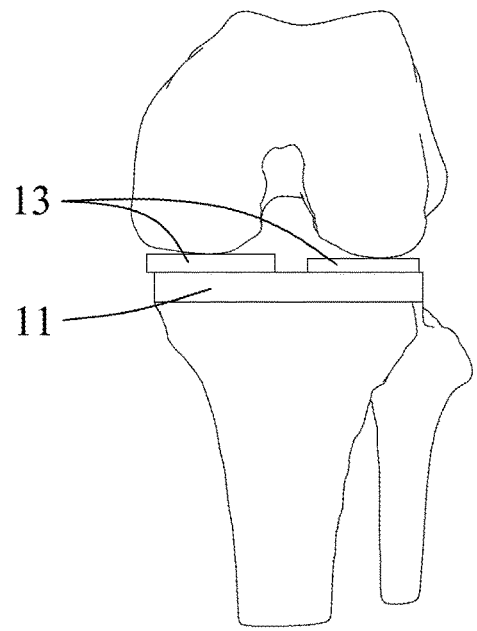

In step S105, a pressure sensor is placed on the to-be-treated part of the bone of the patient to detect pressure, and a parameter that is related to the pressure is obtained. Specifically, as shown in FIGS. 2 and 3, a flexible pressure sensor 11 is placed on the to-be-treated part of the bone of the patient between the femoral condyle and the proximal tibia to detect a first pressure related to a medial condyle of the lower limb of the patient and a second pressure related to a lateral condyle of the lower limb of the patient. It is worth to note that the pressure sensor is not limited to a flexible pressure sensor, and other types of pressure sensors (e.g., mechanical pressure sensor) may be used in other embodiments. Moreover, when a femur and a tibia of the lower limb of the patient are positioned in an extension state for straightening the lower limb (where the femur and the tibia are roughly arranged in an imaginary straight line), while the pressure sensor 11 continues to measure the first pressure and the second pressure, two first pads 12 are placed on the to-be-treated part, where thicknesses respectively of the first pads 12 are such that the first pressure and the second pressure are balanced. Specifically, one of the first pads 12 is placed between the medial condyles respectively of the femur and the tibia, and the other of the first pads 12 is placed between the lateral condyles respectively of the femur and the tibia. Furthermore, when the femur and the tibia of the lower limb of the patient are positioned in a flexion state for bending the lower limb (where the femur and the tibia are turned with respect to each other), while the pressure sensor 11 continues to measure the first pressure and the second pressure, two second pads 13 are placed on the to-be-treated part, where thicknesses respectively of the second pads 13 are such that the first pressure and the second pressure are balanced. Specifically, one of the second pads 13 is placed between the medial condyles respectively of the femur and the tibia, and the other of the second pads 13 is placed between the lateral condyles respectively of the femur and the tibia. Specifically, in step S105, the thicknesses of the first and second pads 12, 13 are measured, and the parameter includes these thicknesses.

Figure 4:
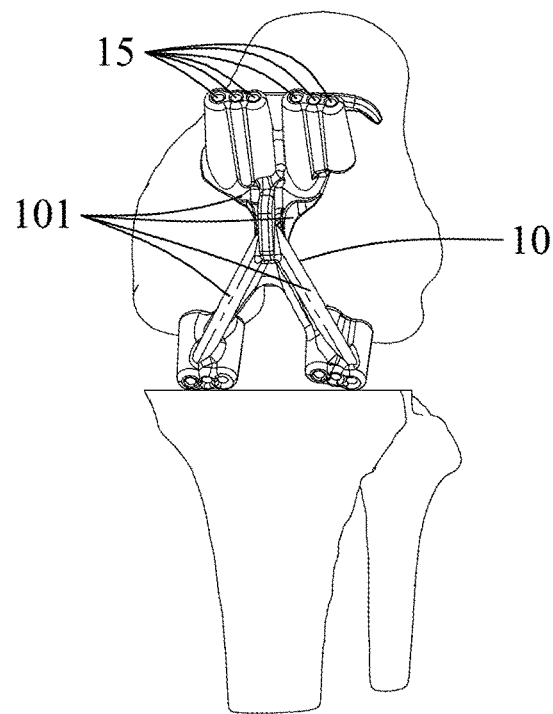

In step S106, the PSI is attached to the to-be-treated part (see FIG. 4). Specifically, the PSI is attached to the femoral condyle, two of the four legs 101 (posterior legs) are attached to the posterior femoral condyle, and remaining two of the four legs 101 (distal legs) are attached to the distal femoral condyle.

After attaching the PSI to the to-be-treated part, in step S107, the PSI is adjusted based on the parameter. Specifically, for each of the legs of the frame 10, one of the through holes 15 is selected based on the parameter, and a pin is inserted into the selected one of the through holes 15. The pins inserted into the through holes 15 of the frame 10 are fastened to the to-be-treated part.

Figure 5:
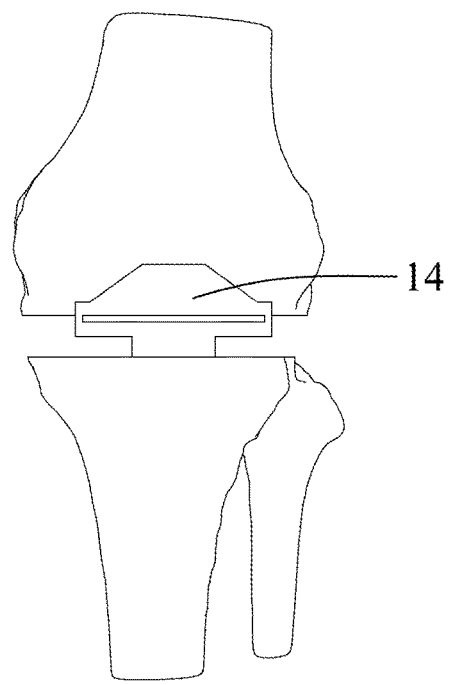
Figure 6:
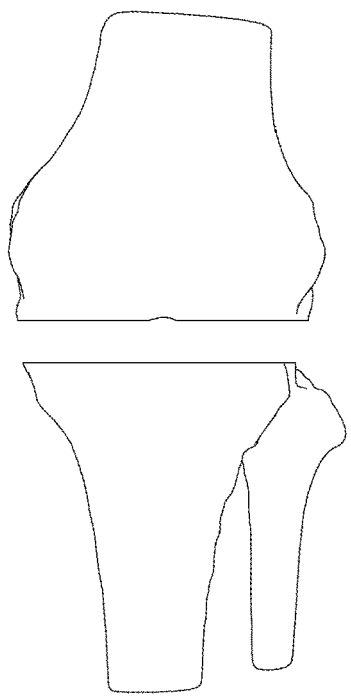
Figure 7:
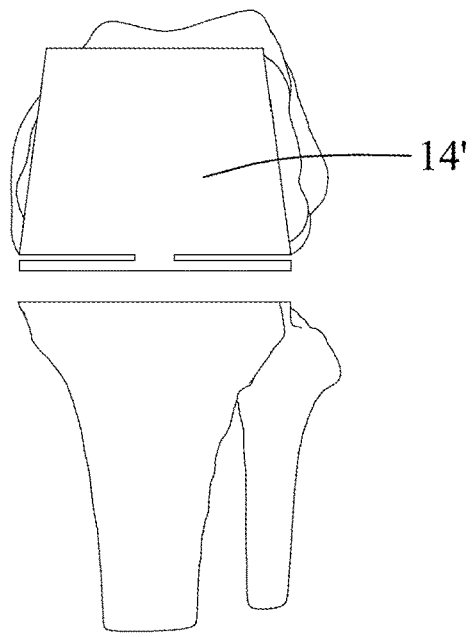

After adjusting the PSI, in step S108, a cutting guide 14 for posterior condyle resection is mounted on the to-be-treated part according to positions of the pins that have been inserted into the through holes 15 of the posterior legs 101 and fastened to the to-be-treated part (see FIG. 5). It is worth to note that after the pins have been fastened to the to-be-treated part, the frame 10 is removed. The cutting guide 14 is used to facilitate resection of a distal end of the femoral condyle adjacent to the proximal tibia during TKA. A post-resection image of the to-be-treated part is schematically shown in FIG. 6, where the cutting guide 14 has been removed. Next, another cutting guide 14' for distal posterior condyle resection is mounted on the resected distal end of the femoral condyle of the to-be-treated part according to positions of the pins inserted into the through holes 15 of the distal legs 101 and fastened to the to-be-treated part (see FIG. 7). To put into other words, the fastened pins determine how and where the cutting guides 14, 14' are to be mounted relative to the to-be-treated part, with the combination of the four through holes 15 selected respectively for the four legs 101 serving the purpose of determining the angles at which the cutting guides 14, 14' are to be mounted on the to-be-treated part. In other words, different combinations of different four of the through holes correspond to different mounting angles of the cutting guides 14, 14'. How to mount the cutting guides 14, 14' according to the positions of the pins of the PSI is known by those skilled in the art, so details related thereto will not be discussed herein for the sake of brevity.

Referring to FIGS. 8 to 11, a second embodiment of the method of orthopedic treatment on a to-be-treated part of a bone of a patient according to the disclosure is illustrated. It should be noted that descriptions regarding steps similar to those of the first embodiment will not be repeated, and only differences between the second embodiment and the first embodiment will be explained in the following paragraphs for the sake of brevity.

In this embodiment, the orthopedic treatment is distal femoral osteotomy, and the to-be-treated part is a segment of a femur of a lower limb (i.e., a left leg or a right leg) of the patient between a nutrient foramen and a shaft of the femur. The method includes steps S201 to S206 delineated below.

Figure 8:
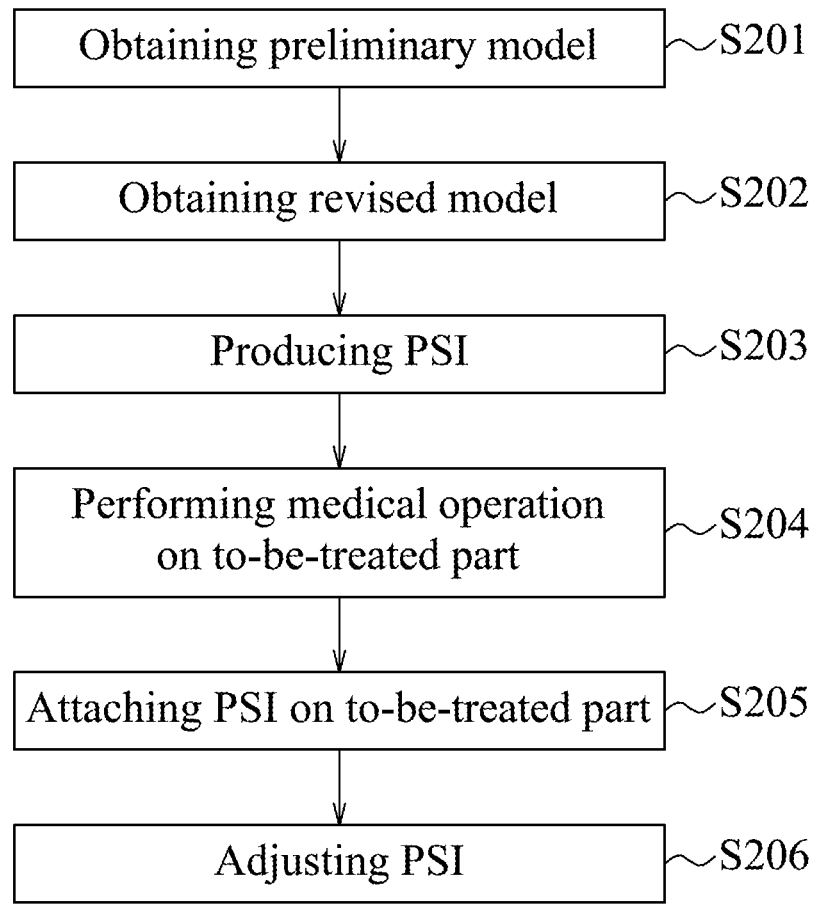
FIG. 8 is a flow chart illustrating the method of orthopedic treatment according to a second embodiment of the disclosure.
Figure 9:
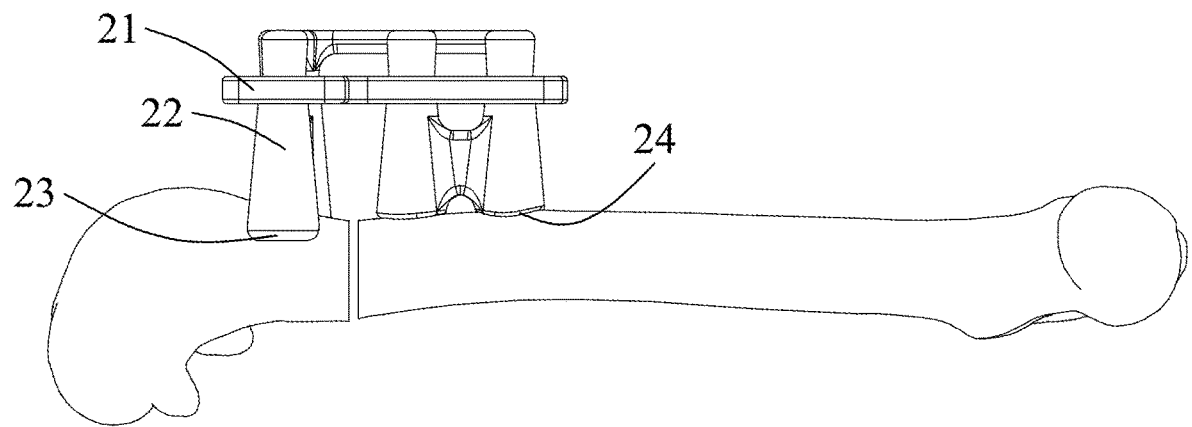
FIGS. 9 and 10 are schematic diagrams for illustrating operations performed in the method of orthopedic treatment according to the second embodiment of the disclosure.
Figure 10:
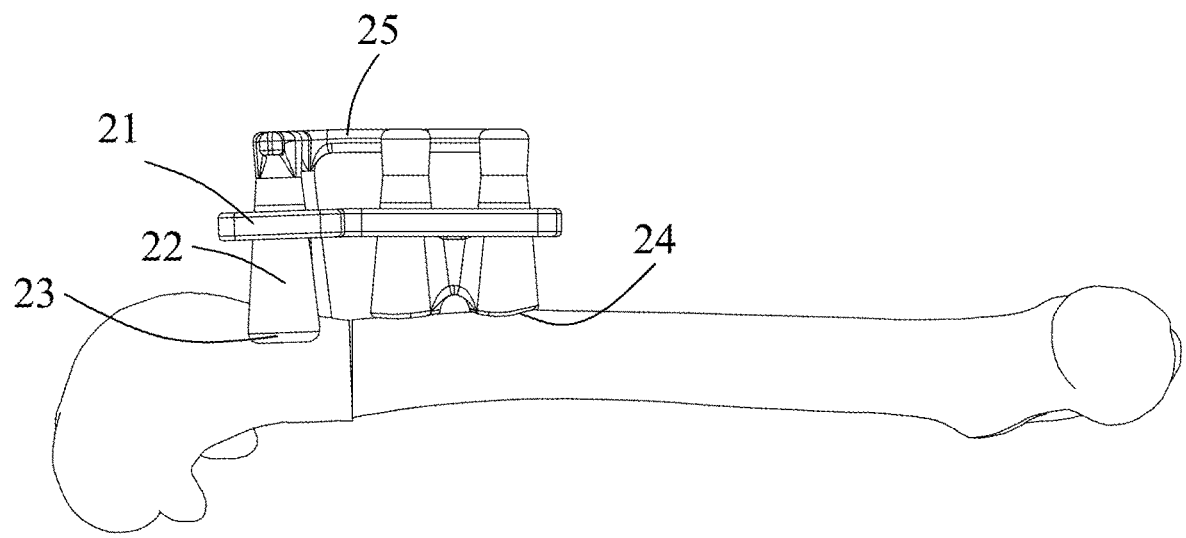
Figure 11:
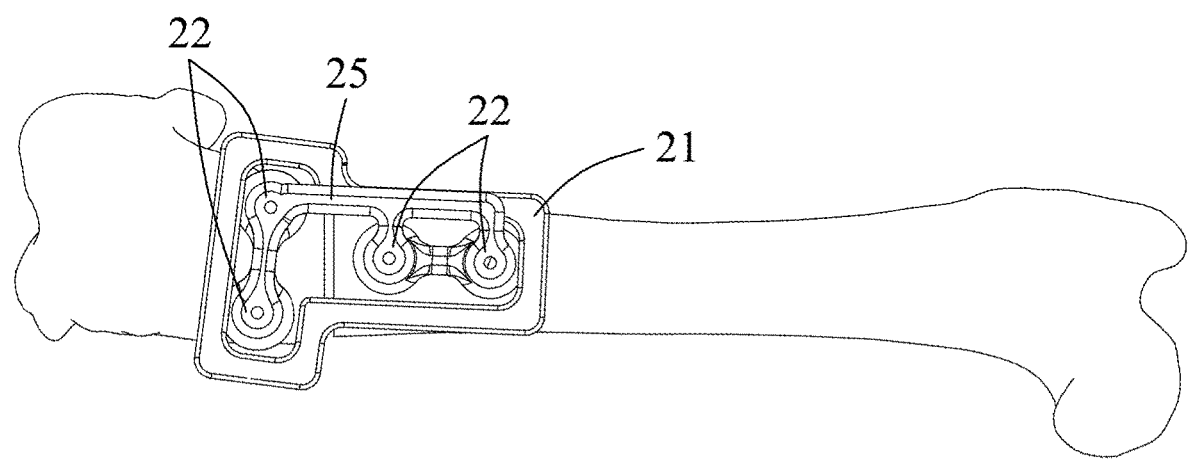
FIG. 11 is a top view of a patient specific instrument (PSI) used in the method of orthopedic treatment according to the second embodiment of the disclosure.

Steps S201 to S203 are respectively similar to steps S101 to S103. Referring to FIGS. 8 to 10, in the second embodiment, the PSI produced in step S203 includes a surrounding member 21 and at least two columns 22. In this embodiment, the PSI includes two pairs of columns 22 (see FIG. 10), with the two columns 22 of each pair being placed side by side and connected together. Each of the columns 22 is shaped like a conical frustum. Each of the columns 22 has a top end, and a base end that is opposite to the top end, that is to be connected to the to-be-treated part, and that has a diameter greater than that of the top end. The surrounding member 21 surrounds the columns 22 and is movable along the columns 22 to adjust a distance between the two pairs of columns 22. In some embodiments, the two pairs of columns 22 are interconnected by an elastic member 25. It is worth to note that compared with the PSI of this embodiment, the preliminary instrument does not include the surrounding member 21 and the elastic member 25.

In step S204, medical operation is performed on the to-be-treated part of the bone of the patient. Particularly, under the distal femoral osteotomy, a segment of the femur is resected such that the femur is divided into two bone pieces one of which has the nutrient foramen and the other of which has the shaft. Since implementation of medical operation has been well known to one skilled in the relevant art, detailed explanation of the same is omitted herein for the sake of brevity.

In step S205, as shown in FIG. 9, the PSI is attached to the to-be-treated part in a manner that one pair of the columns 22 are fastened to one of the bone pieces that has the nutrient foramen via a first attachment member 23 of the PSI, that the other pair of the columns 22 are fastened to the other of the bone pieces that has the shaft via a second attachment member 24 of the PSI, and that the surrounding member 21 is disposed near the top ends of the columns 22.

In step S206, as shown in FIG. 10, visual inspection is performed with respect to relative positioning between the two bone pieces, and the surrounding member 21 is moved along the columns 22 toward the base ends of the columns 22 to shorten a distance between the two pairs of columns 22 based on the visual inspection such that the two bone pieces are brought closer together (ideally, the two bone pieces are brought to abut against each other) for the to-be-treated part to substantially conform with a condition expected of the to-be-treated part after treatment. In this embodiment, the surrounding member 21 is moved toward the femur in step S206.

Figure 12:
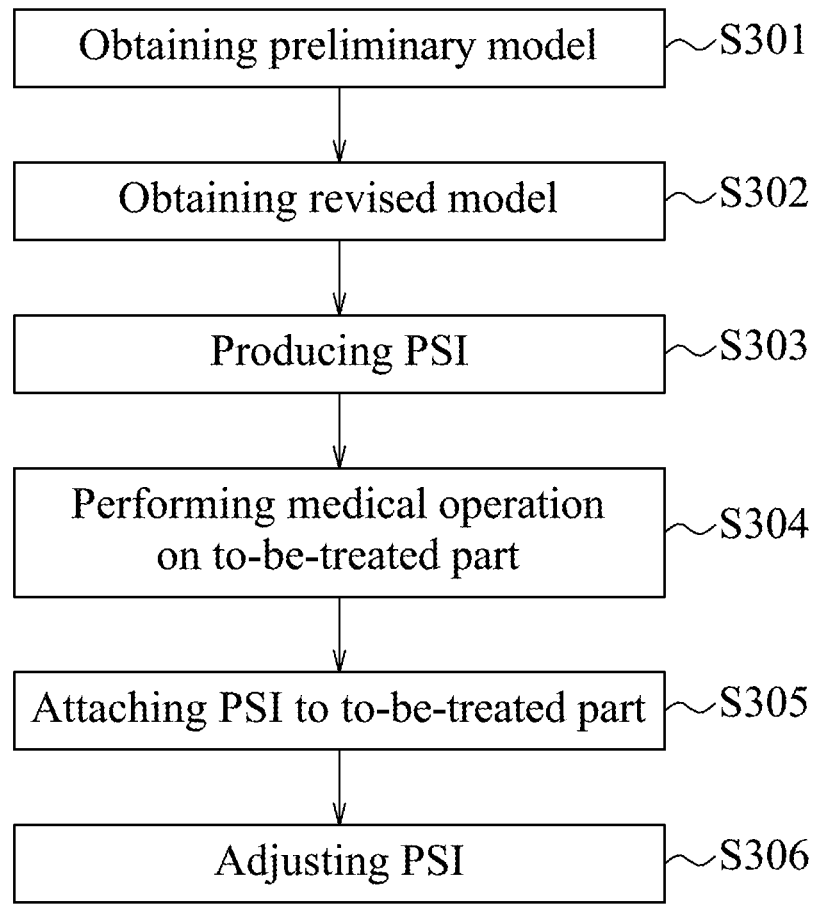
FIG. 12 is a flow chart illustrating the method of orthopedic treatment according to a third embodiment of the disclosure.
Figure 13:
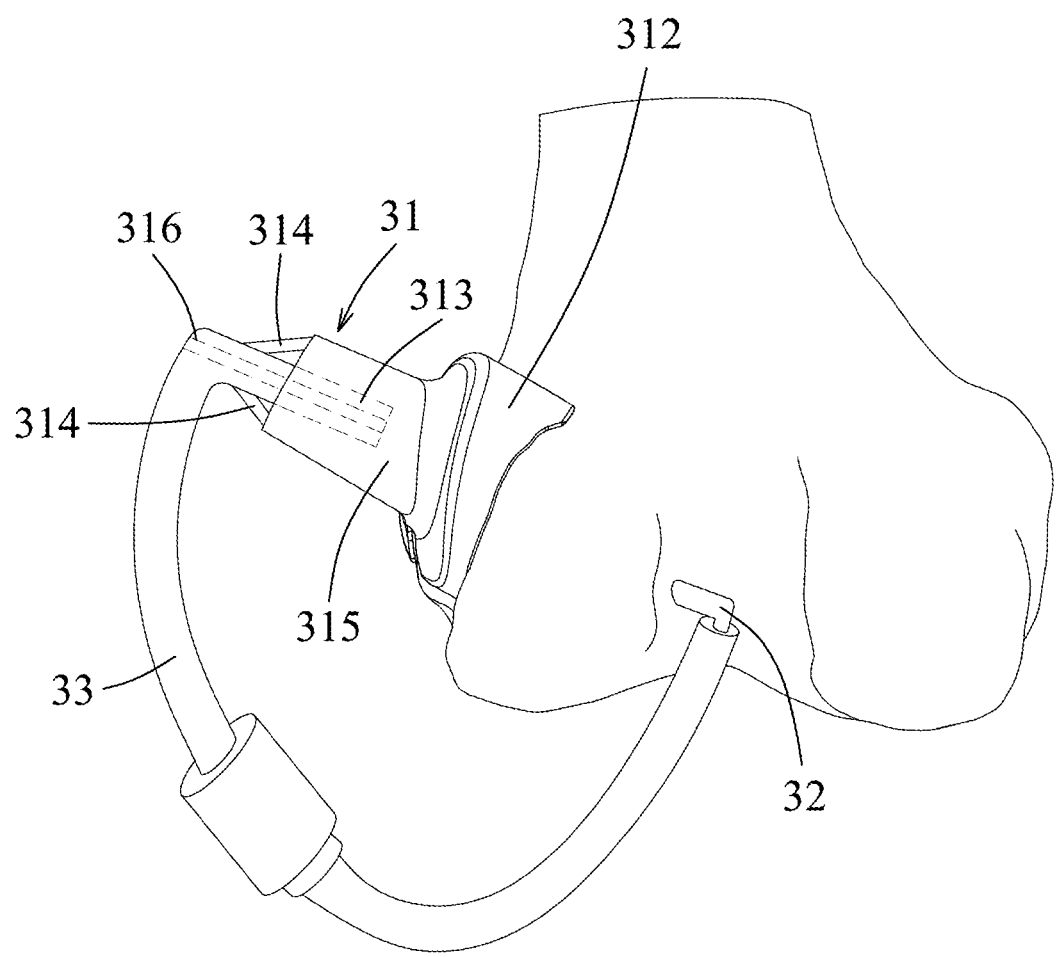
FIG. 13 is a schematic diagrams for illustrating attaching a PSI to a to-be-treated part of a patient in the method of orthopedic treatment according to the third embodiment of the disclosure.

Referring to FIGS. 12 and 13, a third embodiment of the method of orthopedic treatment on a to-be-treated part of a bone of a patient according to the disclosure is illustrated. It should be noted that descriptions regarding steps similar to those of the first embodiment will not be repeated, and only differences between the third embodiment and the first embodiment will be explained in the following paragraphs for the sake of brevity.

In this embodiment, the orthopedic treatment is knee ligament reconstruction surgery, and the to-be-treated part is located around a lateral epicondyle of a femur and a proximal tibia of a lower limb (i.e., a left leg or a right leg) of the patient. The method includes steps S301 to S306 delineated below.

Steps S301 to S303 are respectively similar to steps S101 to S103. Referring to FIG. 13, in the third embodiment, the PSI produced in step S303 includes an adjusting member 31, a rod 32, and a connector 33 interconnecting the adjusting member 31 and the rod 32. In some embodiments, the connector 33 includes two segments that are removably coupled to each other. The rod 32 has a first end connected to the connector 33, and a second end opposite to the first end. The adjusting member 31 includes a connecting component 312, a movable component 313, and a plurality of flexible pieces 314. The connecting component 312 is in a tubular shape formed with a through hole 315, and has a first end to be secured to the to-be-treated part, and a second end opposite to the first end thereof. The movable component 313 is disposed in the through hole 315 of the connecting component 312 without being secured to the connecting component 312, such that the movable component 313 is movable relative to the connecting component 312. The movable component 313 has a first end disposed in the through hole 315 of the connecting component 312, and a second end opposite to the first end thereof and exposed out of the connecting component 312. Each of the flexible pieces 314 is connected between the second end of the movable component 313 and the second end of the connecting component 312, such that the movable component 313 is suspending in the through hole 315 and such that the movable component 313 is allowed to move with respect to the connecting component 312. Since the movable component 313 is suspending in the through hole of the connecting component 312, it can be said that the movable component 313 is sort of universally movable with respect to the connecting component. The movable component 313 is formed with a guiding hole 316 that is in communication with the through hole 315 of the connecting component 312. It is worth to note that compared with the PSI of this embodiment, the preliminary instrument does not include the movable component 313.

In step S304, medical operation is performed on the to-be-treated part of the bone of the patient, allowing visual inspection of the to-be-treated part using an endoscopy.

In step S305, the adjusting member 31 is secured to an outer portion of a condyle (i.e., a medial condyle or a lateral condyle) of one of the femur and the tibia of the lower limb of the patient, where the outer portion of the condyle is opposite to a central portion of the condyle that faces the intercondylar area of the one of the femur and the tibia.

In step S306, visual inspection on the central portion of the condyle is performed using an endoscope (not shown) to determine a target position in the central portion of the condyle to which the rod 32 is to be attached, and a target orientation of the movable component 313 relative to the connecting component 312. Then, the rod 32 is attached to the target position and the orientation the movable component 313 relative to the connecting component 312 is adjusted to the target orientation. A tip of the rod 32 (i.e., the second end thereof) and a tip of the adjusting member 31 (i.e., the first end of the movable component 313) cooperatively define a direction for drilling a hole through the condyle, where the drilled hole allows a knee ligament (which may be artificial) to pass therethrough under the knee ligament reconstruction surgery. Specifically, an orthopedic drilling instrument can be inserted into the guiding hole 316 for drilling the hole through the condyle. It is worth to note that while drilling the hole through the condyle, the PSI is held by a medical professional (e.g., a doctor who is performing the knee ligament reconstruction surgery) to maintain configurations of the PSI.

To sum up, in the method of orthopedic treatment according to the disclosure, the PSI that is adjustable is utilized. Therefore, the PSI may be adapted to real conditions of the to-be-treated part of the patient, enhancing effectiveness of orthopedic treatment and alleviating postoperative discomfort.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of orthopedic treatment on a to-be-treated part of a bone of a patient, comprising steps of:
obtaining, by using a computer aided design (CAD) tool based on profile data that is related to the to-be-treated part, a model of a preliminary instrument that substantially fits the to-be-treated part;

obtaining, by using the CAD tool, a model of a patient specific instrument (PSI) based on the model of the preliminary instrument, the model of the PSI being adjustable to adapt to real conditions of the to-be-treated part;

producing the PSI based on the model of the PSI;

performing medical operation on the to-be-treated part, and then attaching the PSI to the to-be-treated part; and after attaching the PSI to the to-be-treated part, adjusting the PSI such that the PSI is adapted to the real conditions of the to-be-treated part;

before attaching the PSI to the to-be-treated part, placing a pressure sensor on the to-be-treated part to detect pressure, and obtaining a parameter that is related to the pressure, wherein the step of adjusting the PSI is to adjust the PSI based on the parameter;

wherein: the orthopedic treatment is total knee arthroplasty (TKA), and the to-be-treated part is a medial femoral condyle of a femur, a lateral femoral condyle of the femur and a proximal tibia of a tibia of a lower limb of the patient;

in the step of placing a pressure sensor is to place a flexible pressure sensor on the to-be-treated part to detect a first pressure related to the medial condyle and a second pressure related to the lateral condyle of the lower limb of the patient;

the step of producing the PSI is to produce the PSI to include a frame having a plurality of through holes and at least one pin;

the method further comprises, before the step of attaching the PSI to the to-be-treated part, steps of:

placing a first pad on the to-be-treated part such that the first pressure and the second pressure are balanced when the femur and the tibia of the lower limb of the patient are positioned in an extension state, and placing a second pad on the to-be-treated part such that the first pressure and the second pressure are balanced when the femur and the tibia of the lower limb of the patient are positioned in a flexion state;

the step of adjusting the PSI includes selecting, based on the parameter that includes a thickness of the first pad and a thickness of the second pad, at least one of the through holes and inserting the at least one pin respectively into the at least one of the through holes, the at least one pin inserted into the at least one of the through holes being fastened to the to-be-treated part; and the method further comprises, after the step of adjusting the PSI, a step of mounting a cutting guide on the to-be-treated part according to a position of the at least one pin fastened to the to-be-treated part.

2. The method as claimed in claim 1, wherein the step of producing the PSI is to produce the PSI by using 3D printing techniques.

* * * * *